United States Patent

Takado

(10) Patent No.: US 9,813,646 B2
(45) Date of Patent: Nov. 7, 2017

(54) SOLID-STATE IMAGING APPARATUS, IMAGING SYSTEM, AND METHOD FOR DRIVING SOLID-STATE IMAGING APPARATUS, WHERE LONGER ACCUMULATION TIME IS USED FOR LIGHT-SHIELDED PIXELS

(71) Applicant: CANON KABUSHIKI KAISHA, Tokyo (JP)

(72) Inventor: Hisashi Takado, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 14/821,662

(22) Filed: Aug. 7, 2015

(65) Prior Publication Data

US 2016/0044259 A1 Feb. 11, 2016

(30) Foreign Application Priority Data

Aug. 11, 2014 (JP) .................. 2014-163733

(51) Int. Cl.
*H04N 5/361* (2011.01)
*H04N 5/378* (2011.01)

(52) U.S. Cl.
CPC ............. *H04N 5/361* (2013.01); *H04N 5/378* (2013.01)

(58) Field of Classification Search
None
See application file for complete search history.

(56) References Cited

U.S. PATENT DOCUMENTS

| 2005/0083419 A1* | 4/2005 | Honda | H04N 5/361 348/244 |
| 2008/0100736 A1* | 5/2008 | Ise | H04N 5/232 348/311 |
| 2013/0021497 A1* | 1/2013 | Kawamura | H04N 5/361 348/231.3 |
| 2014/0290138 A1* | 10/2014 | Oshima | H04B 10/11 49/25 |
| 2016/0191159 A1* | 6/2016 | Aoyama | H04N 21/436 398/172 |

FOREIGN PATENT DOCUMENTS

| JP | 2005-130045 A | 5/2005 |
| JP | 2009-165051 A | 7/2009 |

* cited by examiner

*Primary Examiner* — Shahbaz Nazrul
(74) *Attorney, Agent, or Firm* — Canon USA, Inc., IP Division

(57) ABSTRACT

A solid-state imaging apparatus includes a first light-shielded pixel region including two or more rows of pixels each including a photoelectric converter which is shielded from light, an aperture pixel region including pixels each including a photoelectric converter which is not shielded from light, and a control unit configured to perform control such that a charge accumulation period for the pixels in the first light-shielded pixel region is longer than a charge accumulation period for the pixels in the aperture pixel region and time to read signals from the pixels in a first row of the first light-shielded pixel region is different from time to read signals from the pixels in a second row different from the first row of the first light-shielded pixel region.

17 Claims, 12 Drawing Sheets

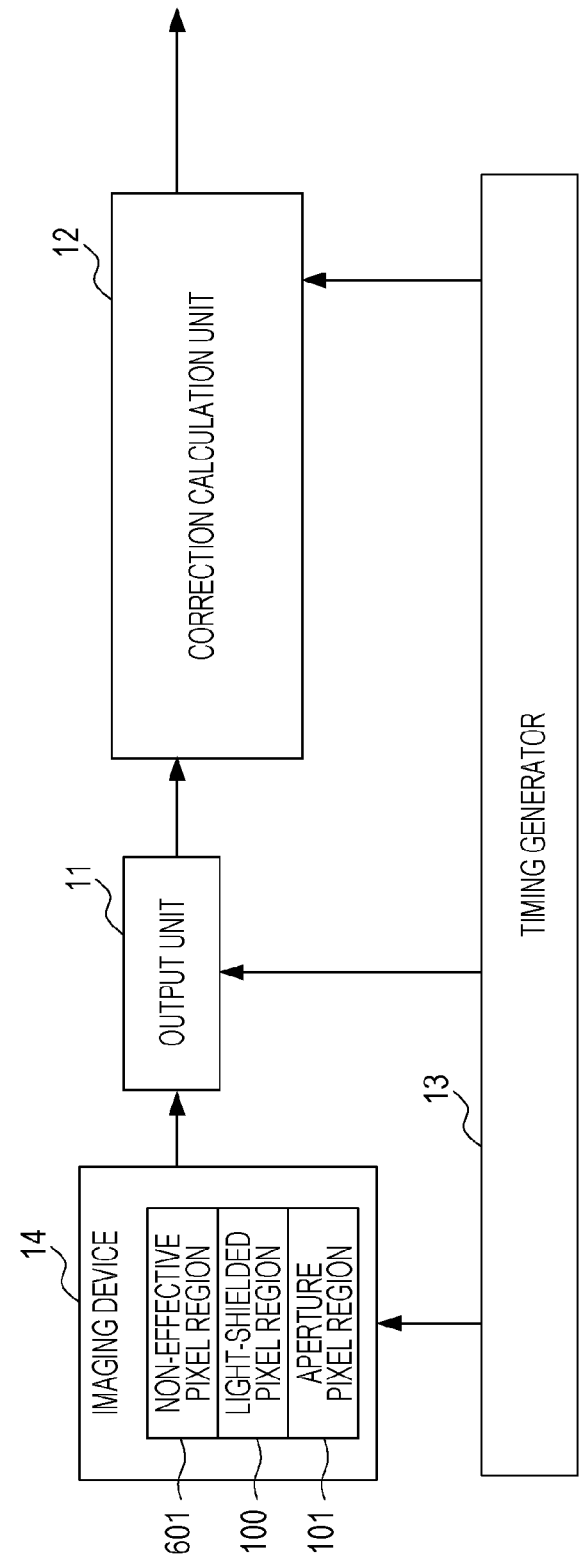

SOLID-STATE IMAGING APPARATUS, IMAGING SYSTEM, AND METHOD FOR DRIVING SOLID-STATE IMAGING APPARATUS, WHERE LONGER ACCUMULATION TIME IS USED FOR LIGHT-SHIELDED PIXELS

BACKGROUND OF THE INVENTION

Field of the Invention

The present invention relates to a solid-state imaging apparatus, an imaging system, and a method for driving the solid-state imaging apparatus.

Description of the Related Art

A solid-state imaging apparatus of a complementary metal-oxide semiconductor (CMOS) or charge-coupled device (CCD) type includes photodiodes that perform photoelectric conversion. If a photodiode is shielded from light, a variation in black offset value will occur due to dark current during photoelectric conversion. The dark current significantly depends on temperature, so that the black offset value significantly varies over time. According to a known technique, a solid-state imaging apparatus is allowed to include pixels for receiving light and pixels shielded from light (hereinafter, "light-shielded pixels") in order to correct a variation in black offset value and correct an image based on information obtained from the light-shielded pixels.

Japanese Patent Laid-Open No. 2005-130045 discloses a technique of extending a charge accumulation period for light-shielded pixels to increase the accuracy of dark current measurement in order to accurately estimate the temperature of an imaging device. Such an imaging apparatus accurately estimates the temperature of the imaging device, so that image processing can be changed depending on the temperature of the imaging device.

SUMMARY OF THE INVENTION

The present invention provides a solid-state imaging apparatus including a first light-shielded pixel region including two or more rows of pixels each including a photoelectric converter which is shielded from light, an aperture pixel region including pixels each including a photoelectric converter which is not shielded from light, and a control unit configured to perform control in such a manner that a charge accumulation period for the pixels in the first light-shielded pixel region is longer than a charge accumulation period for the pixels in the aperture pixel region and time to read signals from the pixels in a first row of the first light-shielded pixel region is different from time to read signals from the pixels in a second row of the first light-shielded pixel region.

Further features of the present invention will become apparent from the following description of exemplary embodiments with reference to the attached drawings.

BRIEF DESCRIPTION OF THE DRAWINGS

FIG. 6 is a diagram illustrating an overall configuration of a solid-state imaging apparatus according to a second embodiment.

DESCRIPTION OF THE EMBODIMENTS

According to the technique disclosed in Japanese Patent Laid-Open No. 2005-130045, a dark current value is measured after accumulated charge is broken. The measurement is accordingly inhibited while charge is being accumulated in light-shielded pixels. Extending a charge accumulation period is effective in increasing the accuracy of measurement of the dark current value, but real-time performance in measurement is reduced. In application of this technique to movie imaging, an interval between correction timings may result in an unnatural image.

Exemplary embodiments, which will be described below, relate to a solid-state imaging apparatus capable of correcting a change in black offset, caused by dark current, over time in movie imaging accurately in real time, an imaging system, and a method for driving the solid-state imaging apparatus.

First Embodiment

Figure 1:
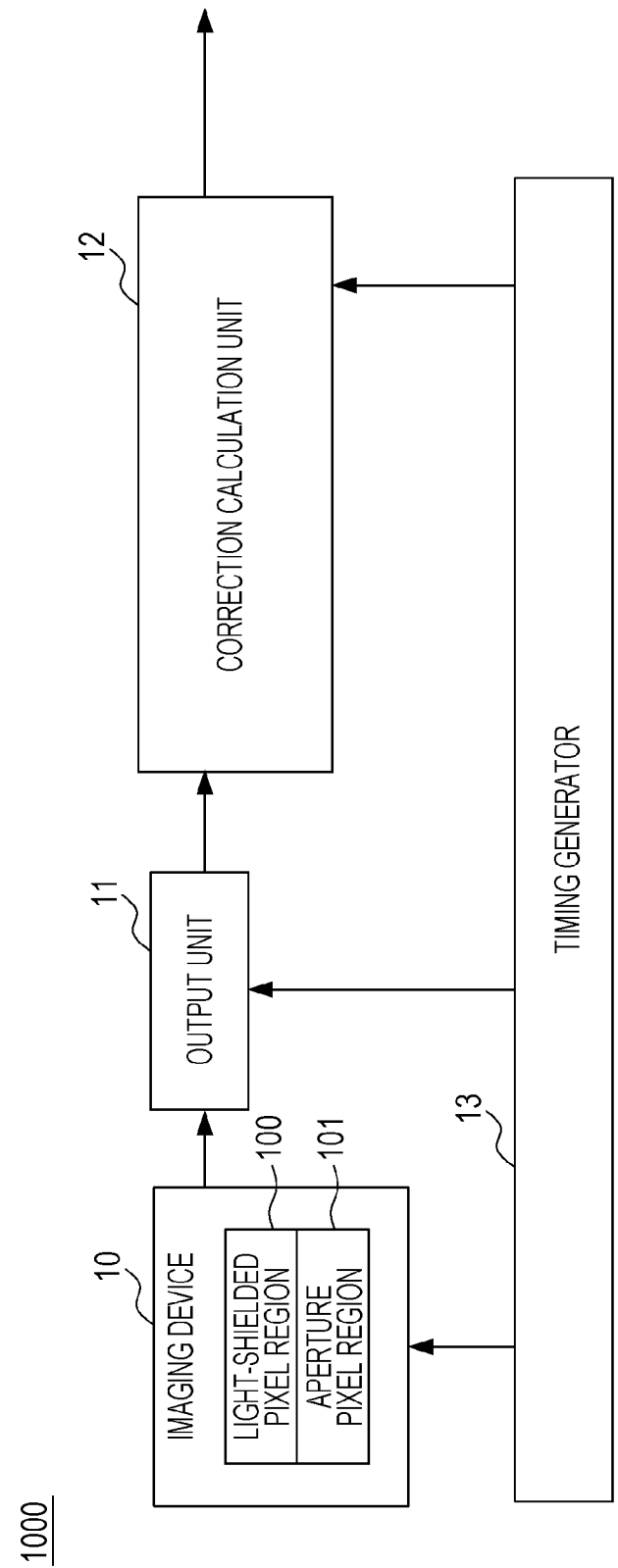
FIG. 1 is a diagram illustrating an overall configuration of a solid-state imaging apparatus according to a first embodiment.

FIG. 1 is a diagram illustrating an exemplary configuration of a solid-state imaging apparatus 1000 according to a first embodiment of the present invention. The solid-state imaging apparatus 1000 includes an imaging device 10, an output unit 11, a correction calculation unit 12, and a timing generator 13. The imaging device 10 includes a light-shielded pixel region 100 and an aperture pixel region 101. The light-shielded pixel region 100 is a first light-shielded pixel region that includes pixels each including a photoelectric converter which is shielded from light. The aperture pixel region 101 includes pixels each including a photoelectric converter which is not shielded from light. The output unit 11 amplifies signals received from the imaging device 10 and sequentially outputs the signals to the correction calculation unit 12. The output unit 11 may include an analog-to-digital conversion unit that converts analog data into digital data. The correction calculation unit 12 performs calculation to correct data obtained from the aperture pixel region 101 with data obtained from the light-shielded pixel region 100. The timing generator 13 controls driving of the imaging device 10 and transmits data indicative of data output timing to the output unit 11 and the correction calculation unit 12.

Figure 2:
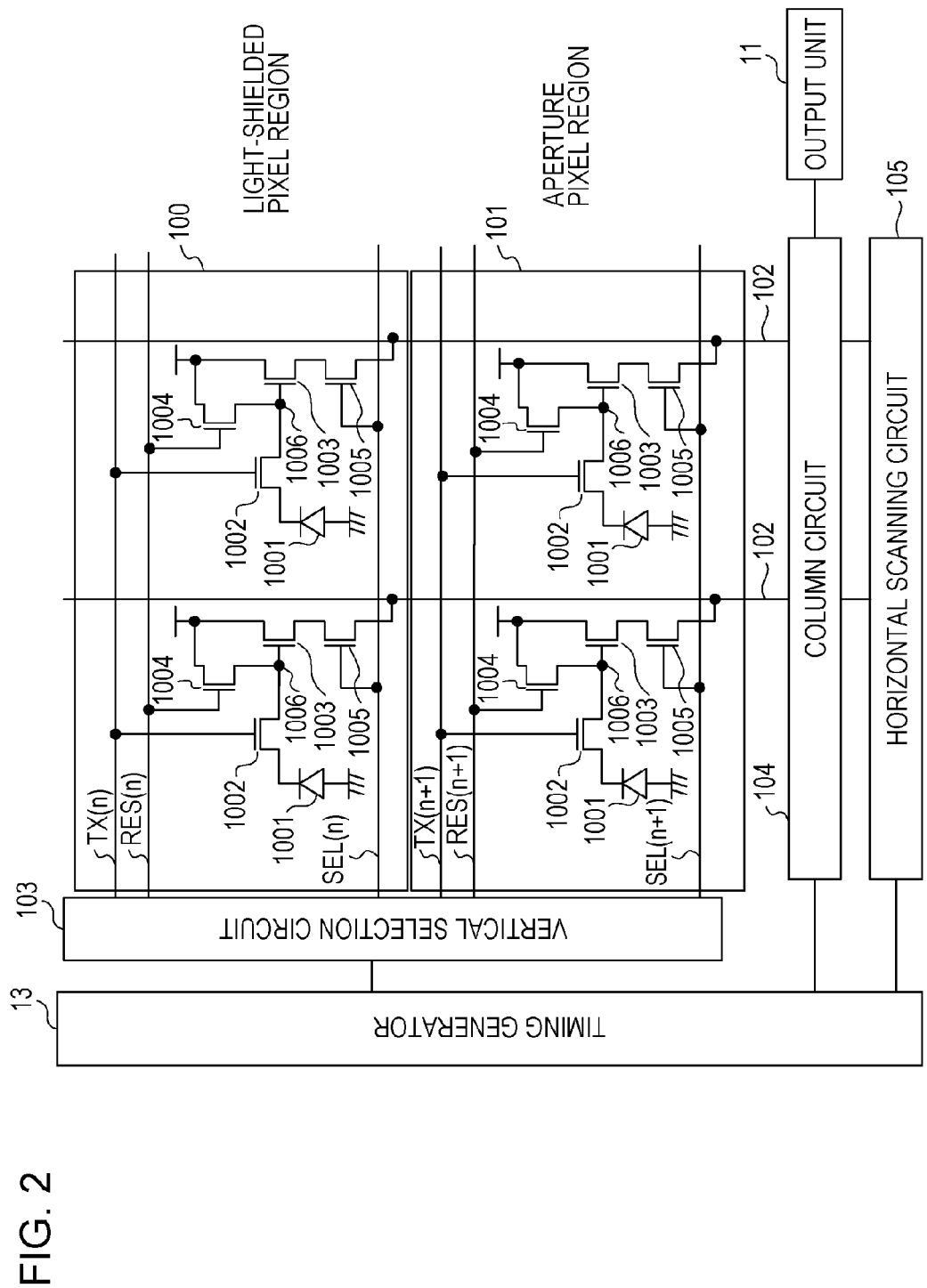
FIG. 2 is a diagram illustrating a pixel array configuration of the solid-state imaging apparatus according to the first embodiment.

FIG. 2 is a diagram illustrating an exemplary configuration of the imaging device 10 in FIG. 1. In FIG. 2, the same components as those in FIG. 1 are designated by the same reference numerals. The imaging device 10 includes the light-shielded pixel region 100, the aperture pixel region 101, column signal lines 102, a vertical selection circuit 103, a column circuit 104, and a horizontal scanning circuit 105. For the convenience of description, FIG. 2 illustrates a case where the light-shielded pixel region 100 includes pixels arranged in one row by two columns and the aperture pixel region 101 includes pixels arranged in one row by two columns. Actually, each of the regions includes the pixels arranged in more rows by more columns. In the present embodiment, the pixels are driven in accordance with a driving signal output from the vertical selection circuit 103 and pixel signals of the pixels are read and output to the column signal line 102.

Each pixel includes a photoelectric converter 1001, a floating diffusion (FD) portion 1006, a transfer transistor 1002, an amplifying transistor 1003, a reset transistor 1004, and a selection transistor 1005. The reset transistor 1004 and the selection transistor 1005 may be omitted in each pixel. The photoelectric converter 1001 is a photodiode, for example. The photoelectric converter 1001 photoelectrically converts incident light to generate charge and accumulates the charge. The charge generated by the photoelectric converter 1001 may be held in a charge holding portion disposed between the photoelectric converter 1001 and the FD portion 1006. The transfer transistor 1002 transfers the charge accumulated in the photoelectric converter 1001 to the FD portion 1006. The potential at the FD portion 1006 varies depending on the amount of charge transferred to the FD portion 1006. The amplifying transistor 1003, constituting a source follower circuit, amplifies a voltage across the FD portion 1006 and outputs the amplified voltage to the column signal line 102. The reset transistor 1004 resets the potential at the FD portion 1006 to a reset voltage supplied from a power supply line. The selection transistor 1005 selectively outputs the voltage amplified by the transfer transistor 1002 to the column signal line 102.

The column circuit 104 processes pixel signals output to each column signal line 102 and stores the signals in a holding section. The column circuit 104 may include a circuit (correlated double sampling circuit) for obtaining the difference between a noise signal and an output signal output to the column signal line 102 to cancel out noise, a circuit for amplifying a signal, and a circuit (sample-and-hold circuit) for holding the amplified signal. The horizontal scanning circuit 105 scans pixel signals held in the column circuit 104 for respective columns and sequentially outputs the pixel signals of the respective columns held in the column circuit 104 to the output unit 11.

Each of the pixels in the light-shielded pixel region 100 includes the photoelectric converter 1001 which is shielded from light. On the other hand, each of the pixels in the aperture pixel region 101 includes the photoelectric converter 1001 which is not shielded from light.

Figure 3:
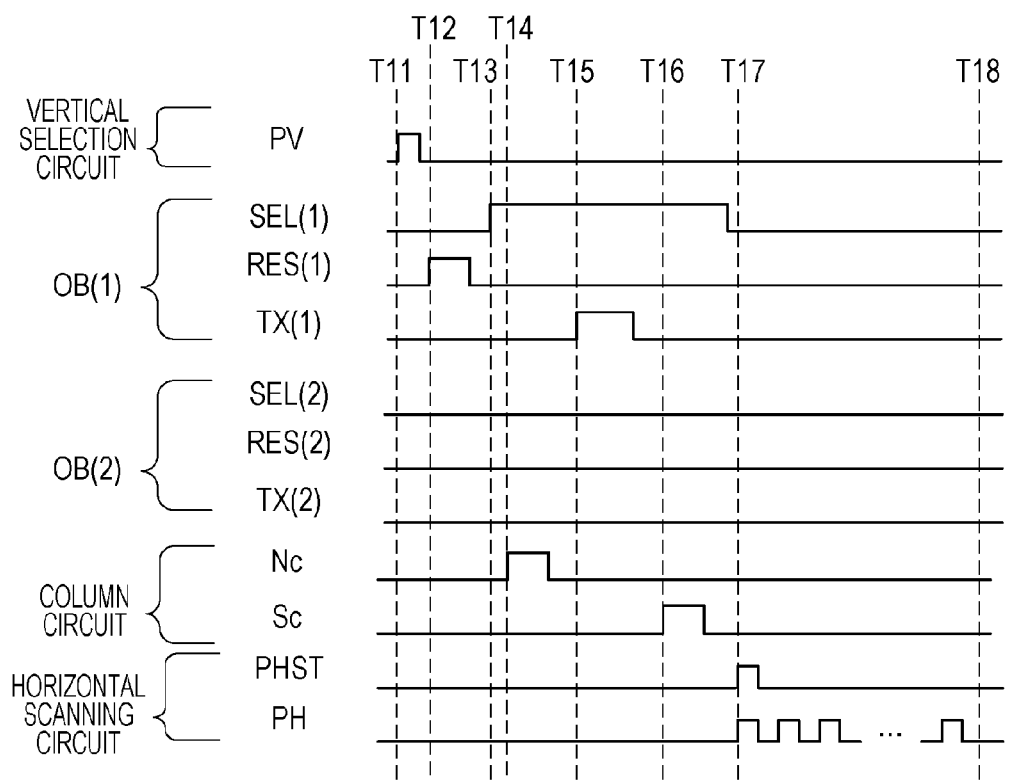
FIG. 3 is a diagram illustrating read timing in the solid-state imaging apparatus according to the first embodiment.

FIG. 3 is a diagram illustrating read timing (driving method) for pixels of one row in the imaging device 10. Although the pixels in the light-shielded pixel region 100 and the pixels in the aperture pixel region 101 are subjected to the same read operation, FIG. 3 illustrates the read operation for the pixels in the light-shielded pixel region 100.

At time T11, the timing generator 13 raises a selection signal PV for the vertical selection circuit 103 to a high level (HIGH), thus selecting a row. For example, the first row, indicated at OB(1) in FIG. 3, is selected. At time T12, the vertical selection circuit 103 raises a signal RES(1) to HIGH, thus turning on the reset transistors 1004 of the pixels in the first row to reset the FD portions 1006 of the pixels in the first row. At time T13, the vertical selection circuit 103 raises a signal SEL(1) to HIGH, thus turning on the selection transistors 1005 of the pixels in the first row to select the pixels in the first row. At time T14, the timing generator 13 raises a signal Nc to HIGH, so that a reset voltage N corresponding to a reset level of the FD portion 1006 of each of the pixels in the first row is held by a reset voltage holding section of the column circuit 104. At time T15, the vertical selection circuit 103 raises a signal TX(1) to HIGH, so that the transfer transistor 1002 transfers charge in the photoelectric converter 1001 to the FD portion 1006 in each of the pixels in the first row. At time T16, the timing generator 13 raises a control line Sc for controlling the column circuit 104 to HIGH, so that a signal voltage S corresponding to the amount of charge transferred to the FD portion 1006 of the pixel of each column is held by a signal holding section of the column circuit 104. Time T16 is signal read timing.

At time T17, the timing generator 13 raises a signal PHST to HIGH, thus instructing the horizontal scanning circuit 105 to start scanning. During a period from time T17 to time T18, signals of the pixels of the respective columns in the first row are sequentially selected each time the horizontal scanning circuit 105 raises a signal PH to HIGH. The column circuit 104 sequentially outputs the signals of the pixels of the respective columns in the first row to the output unit 11. The output unit 11 may output a signal indicative of the amplified difference (S−N) between the signal voltage S and the reset voltage N. Alternatively, the column circuit 104 may supply the difference (S−N) between the signal voltage S and the reset voltage N to the output unit 11.

Figure 4:
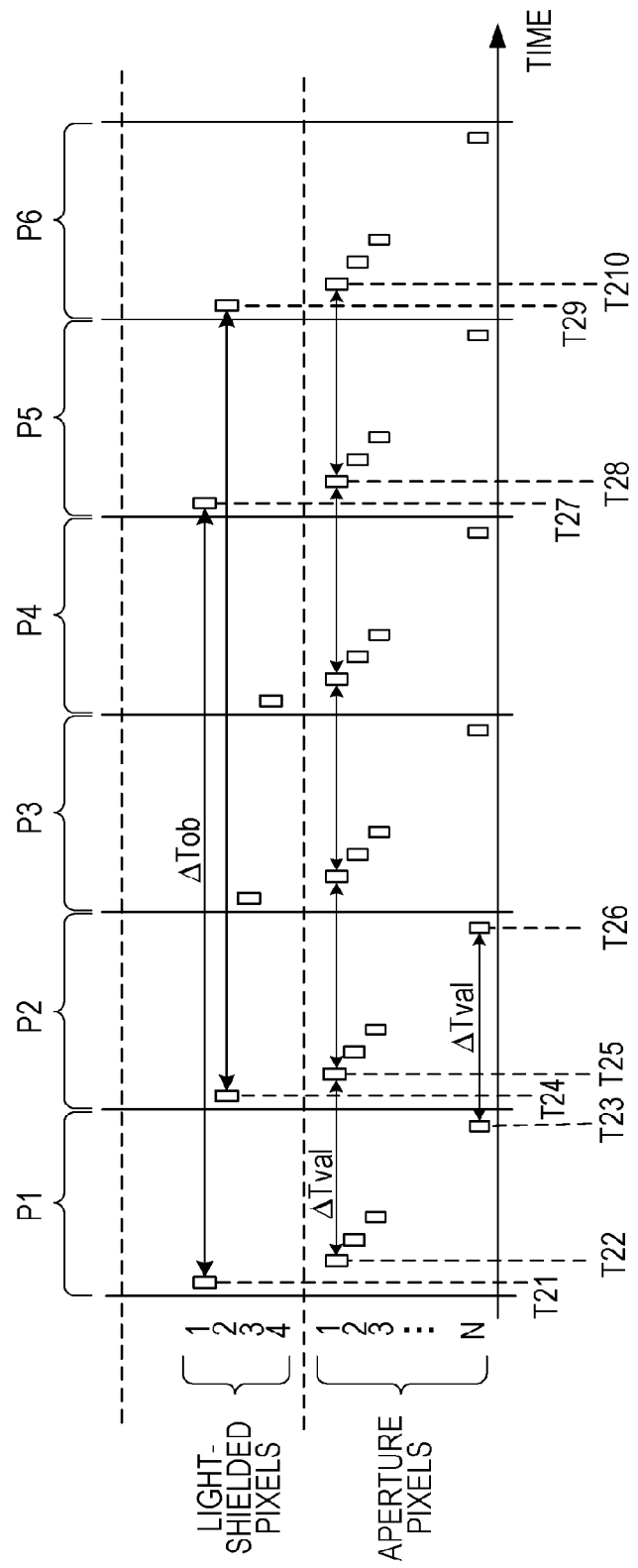
FIG. 4 is a diagram illustrating image frame timing in the solid-state imaging apparatus according to the first embodiment.

FIG. 4 is a diagram illustrating read timing (driving method) for the pixels in the light-shielded pixel region 100 and the aperture pixel region 101 in first to sixth periods P1 to P6. FIG. 4 illustrates a case where the light-shielded pixel region 100 includes four rows of pixels and the aperture pixel region 101 includes N rows of pixels. The first period P1 is a period from the start of reading of pixels in the first row of the light-shielded pixel region 100 to the end of reading of pixels in the last row of the aperture pixel region 101. A period indicated by each rectangle in FIG. 4 corresponds to a period from time T11 to time T17 in FIG. 3, namely, a reading period during which signals are read from pixels in each row.

During the first period P1, at time T21, signals are read from the pixels in the first row of the light-shielded pixel region 100. The second to fourth rows of the light-shielded pixel region 100 are not selected. At time T22, signals are read from the pixels in the first row of the aperture pixel region 101. After that, signals are sequentially read from the pixels in the second to (N−1)th rows of the aperture pixel region 101. At time T23, signals are read from the pixels in the Nth row of the aperture pixel region 101.

During the second period P2, at time T24, signals are read from the pixels in the second row of the light-shielded pixel region 100. The first, third, and fourth rows of the light-shielded pixel region 100 are not selected. At time T25, signals are read from the pixels in the first row of the aperture pixel region 101. After that, signals are sequentially read from the pixels in the second to (N−1)th rows of the aperture pixel region 101. At time T26, signals are read from the pixels in the Nth row of the aperture pixel region 101. A charge accumulation period for the pixels in the first row of the aperture pixel region 101 is a period (ΔTval in FIG. 4) from time T22 to time T25. Similarly, a charge accumulation period for the pixels in the Nth row of the aperture pixel region 101 is a period (ΔTval in FIG. 4) from time T23 to time T26, and equals the charge accumulation period for the pixels in the first row of the aperture pixel region 101.

During the third period P3, signals are not read from the pixels in the first, second, and fourth rows of the light-shielded pixel region 100, but signals are read from the pixels in only the third row of the light-shielded pixel region 100. After that, signals are sequentially read from the pixels in the first to Nth rows of the aperture pixel region 101 as in the first and second periods P1 and P2.

During the fourth period P4, signals are not read from the pixels in the first to third rows of the light-shielded pixel region 100, but signals are read from the pixels in only the fourth row of the light-shielded pixel region 100. Then, signals are sequentially read from the pixels in the first to Nth rows of the aperture pixel region 101 as in the periods P1 to P3.

During the fifth period P5, at time T27, signals are read from the pixels in the first row of the light-shielded pixel region 100. The second to fourth rows of the light-shielded pixel region 100 are not selected. At time T28, signals are read from the pixels in the first row of the aperture pixel region 101. After that, signals are sequentially read from the pixels in the second to Nth rows of the aperture pixel region 101. A charge accumulation period for the pixels in the first row of the light-shielded pixel region 100 is a period (ΔTob in FIG. 4) from time T21 to time T27. The period ΔTob is four times the period ΔTval.

During the sixth period P6, the same read operation as that in the second period P2 is performed. At time T29, signals are read from the pixels in the second row of the light-shielded pixel region 100. The first, third, and fourth rows of the light-shielded pixel region 100 are not selected. At and after time T210, signals are sequentially read from the pixels in the first to Nth rows of the aperture pixel region 101. A charge accumulation period for the pixels in the second row of the light-shielded pixel region 100 is a period from time T24 to time T29, and equals the charge accumulation period for the pixels in the first row of the light-shielded pixel region 100.

Subsequently, the same read operation as that in the third period P3 is performed. Then, the same read operation as that in the fourth period P4 is performed. The read operations in the first to fourth periods P1 to P4 are repeated. During each period, signals are read from the pixels of one row in the light-shielded pixel region 100 and signals are read from the pixels of the N rows in the aperture pixel region 101. The charge accumulation period ΔTob for the pixels in the light-shielded pixel region 100 can be four times the charge accumulation period ΔTval for the pixels in the aperture pixel region 101.

Although FIG. 4 illustrates the case where the light-shielded pixel region 100 includes four rows of pixels and the aperture pixel region 101 includes N rows of pixels, the number of rows of pixels in the light-shielded pixel region 100 is not limited to four. The light-shielded pixel region 100 includes two or more rows of pixels. Furthermore, it is not always necessary to read signals from the pixels in all rows of the aperture pixel region 101 included in the imaging device 10. Signals may be read from pixels in an intended portion of the aperture pixel region 101.

The vertical selection circuit 103, serving as a control unit, performs control in such a manner that each charge accumulation period ΔTob for the pixels in the light-shielded pixel region 100 is longer than each charge accumulation period ΔTval for the pixels in the aperture pixel region 101. In addition, the vertical selection circuit 103 performs control in such a manner that time T21 to read signals from pixels in a first row of the light-shielded pixel region 100 is different from time T24 to read signals from pixels in a second row different from the first row of the light-shielded pixel region 100.

Although an interval between time T21 to read signals from the pixels in the first row of the light-shielded pixel region 100 and time T24 to read signals from the pixels in the second row of the light-shielded pixel region 100 is equal to the charge accumulation period ΔTval for the pixels in the aperture pixel region 101 in FIG. 4, the present invention is not limited to this case. The vertical selection circuit 103 may perform control such that the interval between time T21 to read signals from the pixels in the first row of the light-shielded pixel region 100 and time T24 to read signals from the pixels in the second row of the light-shielded pixel region 100 is longer than or equal to the charge accumulation period ΔTval for the pixels in the aperture pixel region 101.

Figure 5A:
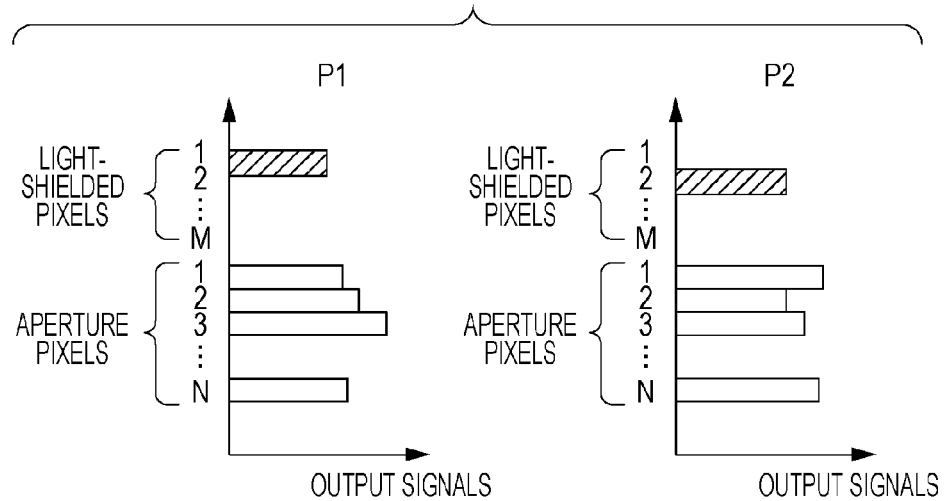
FIGS. 5A and 5B are diagrams illustrating a correction calculation unit of the solid-state imaging apparatus according to the first embodiment.

FIG. 5A is a conceptual diagram illustrating output signals of pixels of a certain column in the light-shielded pixel region 100 and the aperture pixel region 101 in the first and second periods P1 and P2. During the first period P1, signals are output from the pixels in the first row of the light-shielded pixel region 100 and signals are output from the pixels in the first to Nth rows of the aperture pixel region 101. During the second period P2, signals are output from the pixels in the second row of the light-shielded pixel region 100 and signals are output from the pixels in the first to Nth rows of the aperture pixel region 101. The correction calculation unit 12 corrects signals output from the pixels in the aperture pixel region 101 during each period with signals output from the pixels in the light-shielded pixel region 100 during the period.

Figure 5B:
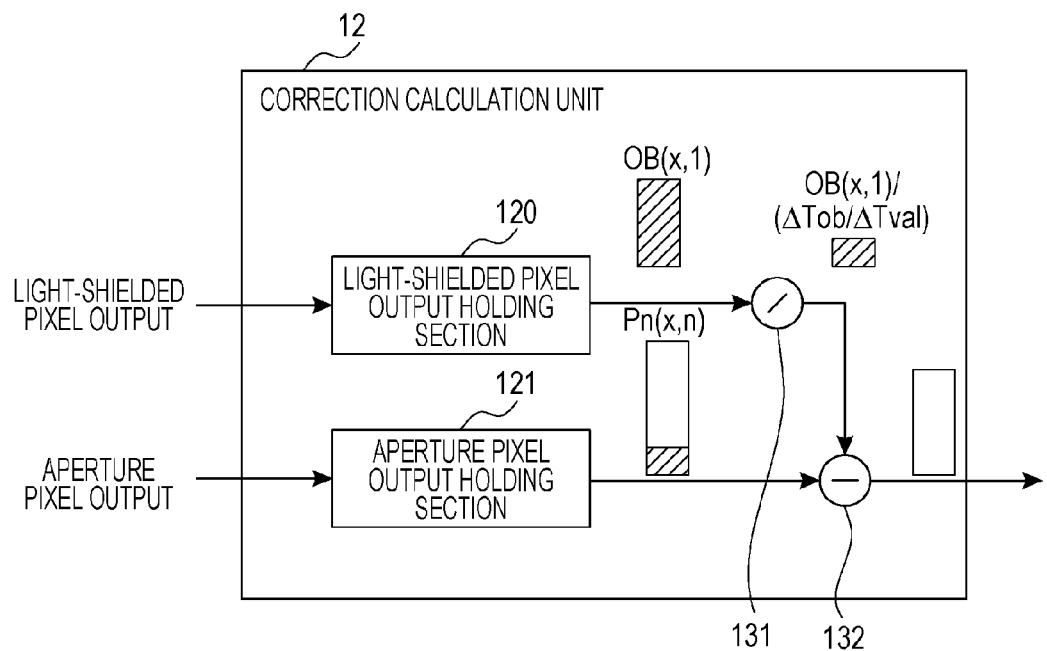

FIG. 5B is a diagram illustrating an exemplary method of correction by the correction calculation unit 12 in the first embodiment. During the first period P1, a light-shielded pixel output holding section 120 holds output signals of the pixels in the first row of the light-shielded pixel region 100. Let OB(x, 1) denote a value of an output signal, held by the light-shielded pixel output holding section 120, of a pixel in the first row of the light-shielded pixel region 100. If correction is performed for each column, the light-shielded pixel output holding section 120 may include a line memory. If an average value (hereinafter, "column average value") of signals of pixels of columns is used because of a small column-to-column variation, the light-shielded pixel output holding section 120 may include a line averaging circuit and a memory for storing data of one pixel. The light-shielded pixel output holding section 120 outputs a signal based on an output signal of a pixel in the light-shielded pixel region 100.

An aperture pixel output holding section 121 holds output signals of the pixels in the aperture pixel region 101 and outputs a signal in synchronization with calculation timing. Let Pn(x, n) denote an output value of a pixel in the nth row of the aperture pixel region 101. If correction is performed for each column, the light-shielded pixel output holding section 120 outputs an output value of a pixel of a column, specified by a column number of a pixel to be corrected in the aperture pixel region 101, in the light-shielded pixel region 100. If a column average value is used, the same column average value is used during a single period.

The pixels in the light-shielded pixel region 100 are given a charge accumulation period which is (ΔTob/ΔTval) times a charge accumulation period for the pixels in the aperture pixel region 101. Assuming that a black offset value is proportional to the charge accumulation period, a division section 131 divides the output value OB(x, 1) output from the light-shielded pixel output holding section 120 by (ΔTob/ΔTval) and outputs a signal indicating the quotient as a black offset correction value. The value (ΔTob/ΔTval) is the ratio of the charge accumulation period ΔTob for the pixels in the light-shielded pixel region 100 to the charge accumulation period ΔTval for the pixels in the aperture pixel region 101. A subtraction section 132 subtracts the output signal (black offset correction value) of the division section 131 from the output signal Pn(x, n) of the aperture pixel output holding section 121 and outputs a signal indicative of the difference as an output signal of the correction calculation unit 12.

During the second period P2, the correction calculation unit 12 performs correction with signals output from the pixels in the second row of the light-shielded pixel region 100 during this period in a manner similar to that in the first period P1.

In the above-described correction, correction values obtained from the pixels in the light-shielded pixel region 100 can be updated in real time during each period. If the charge accumulation period for the pixels in the light-shielded pixel region 100 is equal to that for the pixels in the aperture pixel region 101, a signal value may diminish, resulting in a poor S/N ratio of this signal to noise (read noise) output from a pixel and the column circuit 104. According to the present embodiment, the charge accumulation period ΔTob for the pixels in the light-shielded pixel region 100 is longer than the charge accumulation period ΔTval for the pixels in the aperture pixel region 101, so that a correction value for black offset caused by dark current can be obtained accurately.

Second Embodiment

FIG. 6 is a diagram illustrating an exemplary configuration of a solid-state imaging apparatus 2000 according to a second embodiment of the present invention. In FIG. 6, the solid-state imaging apparatus 2000 includes an imaging device 14 instead of the imaging device 10 of the solid-state imaging apparatus 1000 in FIG. 1. Unlike the imaging device 10, the imaging device 14 includes a non-effective pixel region 601. The difference between the second embodiment and the first embodiment will now be described. The solid-state imaging apparatus 2000 includes the imaging device 14, an output unit 11, a correction calculation unit 12, and a timing generator 13. The imaging device 14 includes a light-shielded pixel region 100 including pixels each including a light-shielded photoelectric converter 1001, an aperture pixel region 101 including pixels each including a normal photoelectric converter 1001, and the non-effective pixel region 601 including pixels each including no photoelectric converter 1001. Unlike the pixels in the aperture pixel region 101, the pixels in the non-effective pixel region 601 include no photoelectric converter 1001.

Figure 7:
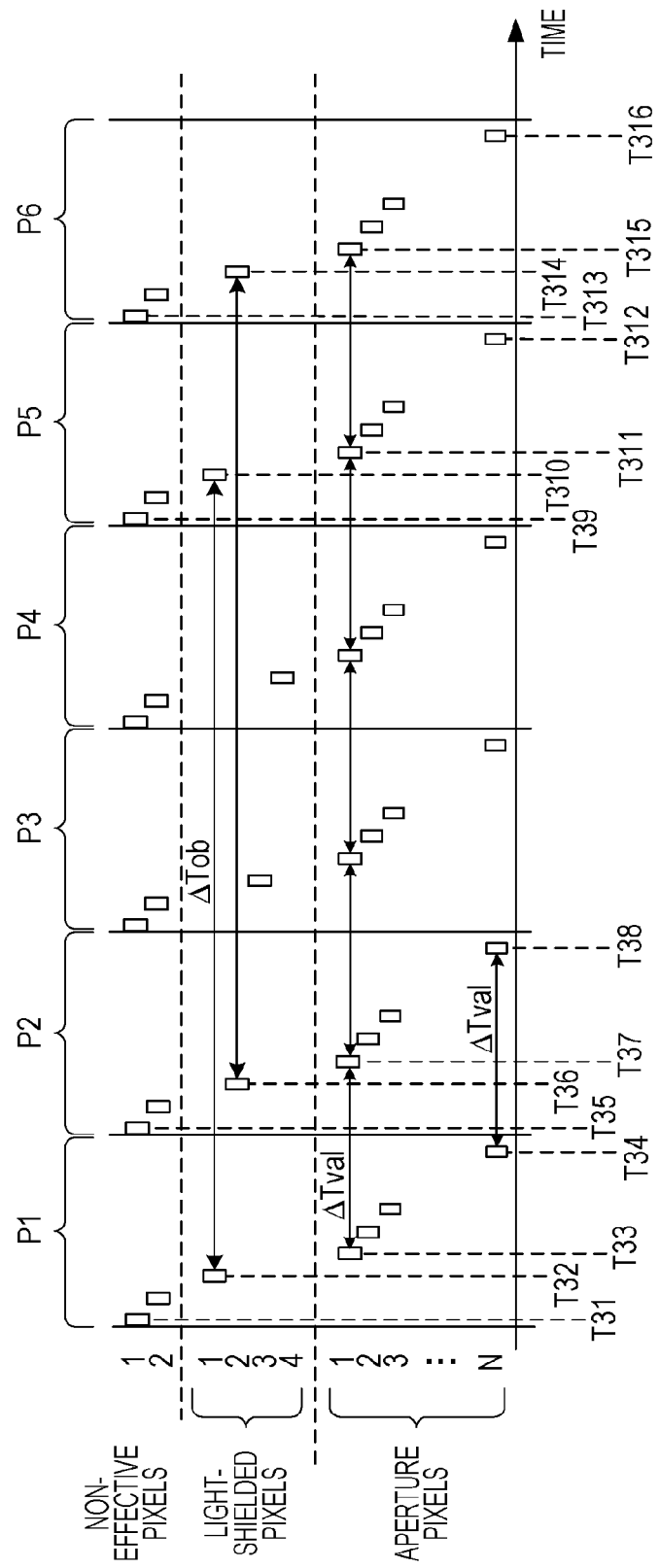
FIG. 7 is a diagram illustrating image frame timing in the solid-state imaging apparatus according to the second embodiment.

FIG. 7, corresponding to FIG. 4, is a diagram illustrating signal read timing (driving method) for the pixels in the non-effective pixel region 601, the light-shielded pixel region 100, and the aperture pixel region 101 in first to sixth periods P1 to P6. FIG. 7 illustrates a case where the non-effective pixel region 601 includes two rows of pixels, the light-shielded pixel region 100 includes four rows of pixels, and the aperture pixel region 101 includes N rows of pixels. The first period P1 is a period from the start of reading of pixels in the first row of the non-effective pixel region 601 to the end of reading of pixels in the Nth row of the aperture pixel region 101. A period indicated by each rectangle in FIG. 7 corresponds to a period from time T11 to time T17 in FIG. 3, namely, a reading period during which signals are read from pixels in each row, as in the first embodiment.

During the first period P1, at time T31, signals are read from the pixels in the first and second rows of the non-effective pixel region 601 such that the signals are sequentially read from the pixels of two rows in ascending order from the first row. At time T32, signals are read from the pixels in the first row of the light-shielded pixel region 100. Signals are not read from the pixels in the second to fourth rows of the light-shielded pixel region 100. During a period from time T33 to time T34, signals are sequentially read from the pixels in the first to Nth rows of the aperture pixel region 101 in ascending order from the first row.

During the second period P2, at time T35, signals are read from the pixels in the first and second rows of the non-effective pixel region 601 such that the signals are sequentially read from the pixels of two rows in ascending order from the first row. At time T36, signals are read from the pixels in the second row of the light-shielded pixel region 100. Signals are not read from the pixels in the first, third, and fourth rows of the light-shielded pixel region 100. During a period from time T37 to time T38, signals are sequentially read from the pixels in the first to Nth rows of the aperture pixel region 101 in ascending order from the first row. A charge accumulation period for the pixels in the first row of the aperture pixel region 101 is a period from time T33 to time T37 (ΔTval in FIG. 7). Similarly, a charge accumulation period for the pixels in the Nth row of the aperture pixel region 101 is a period from time T34 to time T38 (ΔTval in FIG. 7), and equals the charge accumulation period for the pixels in the first row of the aperture pixel region 101.

During the third period P3, signals are not read from the pixels in the first, second, and fourth rows of the light-shielded pixel region 100, but signals are read from the pixels in only the third row of the light-shielded pixel region 100. After that, signals are sequentially read from the pixels in the first to Nth rows of the aperture pixel region 101 in ascending order from the first row, as in the first and second periods P1 and P2.

During the fourth period P4, signals are not read from the pixels in the first to third rows of the light-shielded pixel region 100, but signals are read from the pixels in only the fourth row of the light-shielded pixel region 100. After that, signals are sequentially read from the pixels in the first to Nth rows of the aperture pixel region 101 in ascending order from the first row, as in the first to third periods P1 to P3.

During the fifth period P5, at time T39, signals are sequentially read from the pixels in the first and second rows of the non-effective pixel region 601 in ascending order from the first row. At time T310, signals are read from the pixels in the first row of the light-shielded pixel region 100. The second to fourth rows of the light-shielded pixel region 100 are not selected. During a period from time T311 to time T312, signals are sequentially read from the pixels in the first to Nth rows of the aperture pixel region 101 in ascending order from the first row. A charge accumulation period for the pixels in the first row of the light-shielded pixel region 100 is a period (ΔTob in FIG. 7) from time T32 to time T310. The period ΔTob is four times the period ΔTval.

During the sixth period P6, the same read operation as that in the second period P2 is performed. At time T313, signals are sequentially read from the pixels in the first and second rows of the non-effective pixel region 601 in ascending order from the first row. At time T314, signals are read from the pixels in the second row of the light-shielded pixel region 100. The first, third, and fourth rows of the light-shielded pixel region 100 are not selected. During a period from time T315 to time T316, signals are sequentially read from the pixels in the first to Nth rows of the aperture pixel region 101 in ascending order from the first row.

After that, the same read operation as that in the third period P3 is performed. Then, the same read operation as that in the fourth period P4 is performed. The read operations in the periods P1 to P4 are repeated. During each period, signals are read from the pixels of the two rows in the non-effective pixel region 601, signals are read from the pixels of one row in the light-shielded pixel region 100, and signals are read from the pixels of the N rows in the aperture pixel region 101. The charge accumulation period for the pixels in the light-shielded pixel region 100 can be four times the charge accumulation period for the pixels in the aperture pixel region 101.

Although FIG. 7 illustrates the case where the non-effective pixel region 601 includes two rows of pixels, the light-shielded pixel region 100 includes four rows of pixels, and the aperture pixel region 101 includes N rows of pixels, the present invention is not limited to the case where the non-effective pixel region 601 includes two rows of pixels and the light-shielded pixel region 100 includes four rows of pixels. Furthermore, it is not always necessary to read signals from pixels in all rows of the aperture pixel region 101. Signals may be read from pixels in an intended portion of the aperture pixel region 101.

Figure 8A:
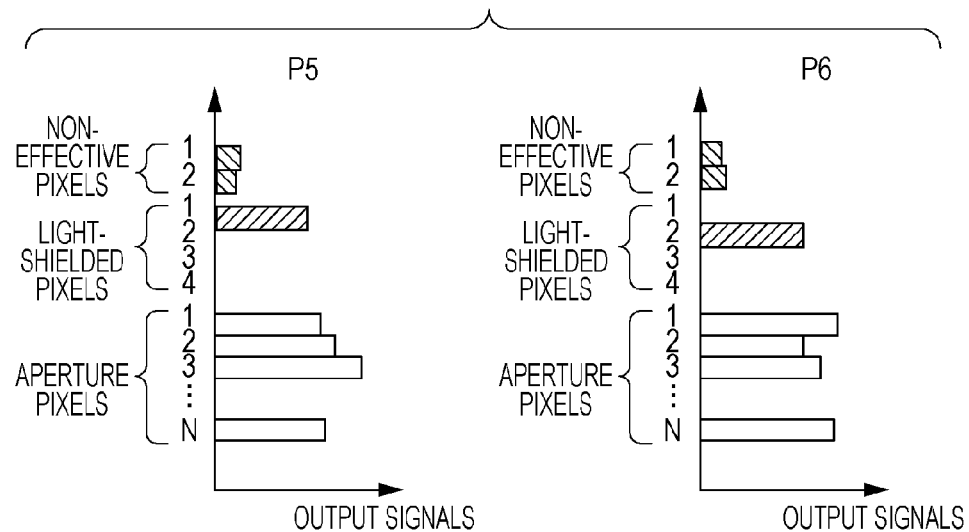
FIGS. 8A and 8B are diagrams illustrating a correction calculation unit of the solid-state imaging apparatus according to the second embodiment.

FIG. 8A is a schematic diagram illustrating output signals of pixels of a certain column in the non-effective pixel region 601, the light-shielded pixel region 100, and the aperture pixel region 101 in the fifth and sixth periods P5 and P6. The correction calculation unit 12 corrects signals output from the pixels in the aperture pixel region 101 during each period with signals output from the pixels in the non-effective pixel region 601 and signals output from the pixels in the light-shielded pixel region 100 during the period.

Figure 8B:
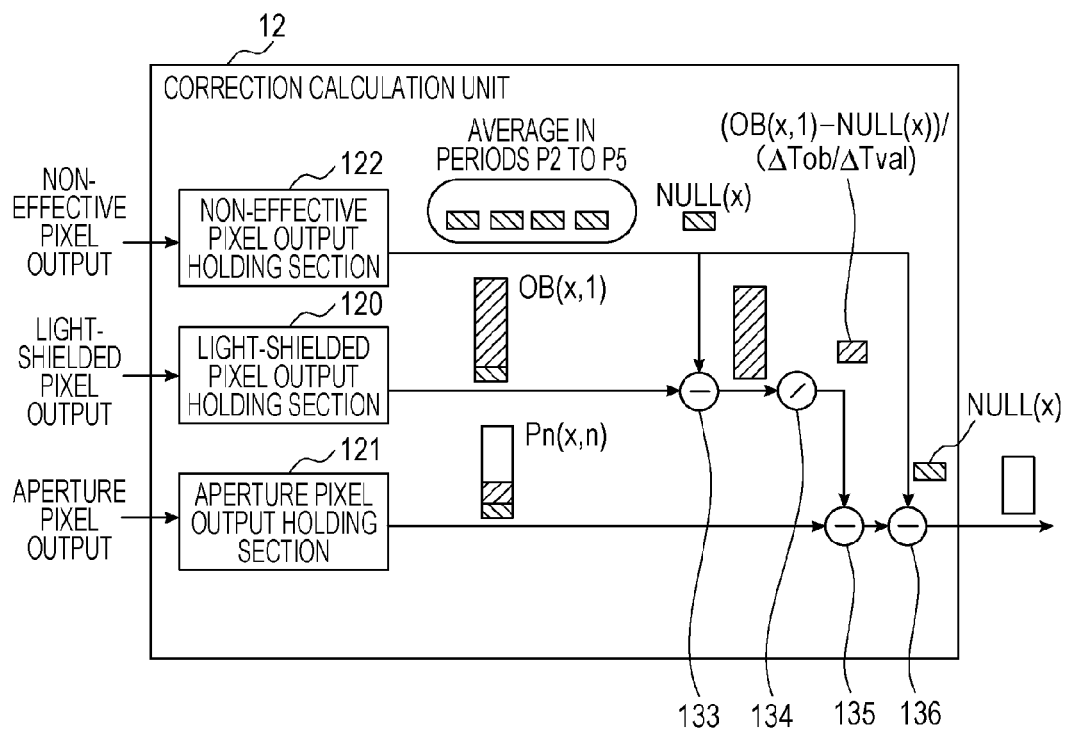

FIG. 8B is a diagram illustrating a method of correction by the correction calculation unit 12 in the second embodiment. During the fifth period P5, a light-shielded pixel output holding section 120 holds output signals of the pixels in the first row of the light-shielded pixel region 100. Let OB(x, 1) denote a value of an output signal, held by the light-shielded pixel output holding section 120, of a pixel in the first row of the light-shielded pixel region 100. If the correction calculation unit 12 performs correction for each column, the light-shielded pixel output holding section 120 may include a line memory. If a column average value is used because of a small column-to-column variation, the light-shielded pixel output holding section 120 may include a line averaging circuit and a memory for storing data of one pixel. The light-shielded pixel output holding section 120 outputs a signal based on an output signal of a pixel in the light-shielded pixel region 100.

A non-effective pixel output holding section 122 holds output signals of the pixels in the non-effective pixel region 601. An output signal of a pixel in the non-effective pixel region 601 mainly includes an offset component of a circuit other than the photoelectric converter 1001. The circuit offset component includes a variation but has less dependence on temperature than a dark current component. Averaging output signals of pixels of frames can reduce the effect of variation. The non-effective pixel output holding section 122, therefore, holds an average value of data of several frames. Let NULL(x) denote a value of an output signal, held by the non-effective pixel output holding section 122, of a pixel in the non-effective pixel region 601. If correction is performed for each column, the non-effective pixel output holding section 122 may include a line memory. If a column average value is used because of a small column-to-column variation, the non-effective pixel output holding section 122 may include a line averaging circuit and a memory for storing data of one pixel in addition to a frame averaging circuit. The non-effective pixel output holding section 122 outputs a signal based on an output signal of a pixel in the non-effective pixel region 601.

An aperture pixel output holding section 121 holds output signals of the pixels in the aperture pixel region 101 and outputs a signal in synchronization with calculation timing. Let Pn(x, n) denote an output value of a pixel in the nth row of the aperture pixel region 101. If correction is performed for each column, the light-shielded pixel output holding section 120 and the non-effective pixel output holding section 122 each output a value of a pixel of a column specified by a column number of a pixel to be corrected in the aperture pixel region 101. If a column average value is used, the same column average value is used during a single period.

Calculation of a black offset value will now be described. The pixels in the light-shielded pixel region 100 include a circuit offset component and a dark current component proportional to the charge accumulation period which is (ΔTob/ΔTval) times the charge accumulation period for the pixels in the aperture pixel region 101. A first subtraction section 133 subtracts the output signal NULL(x) of the non-effective pixel output holding section 122 from the output signal OB(x, 1) of the light-shielded pixel output holding section 120 (OB(x, 1)-NULL(x)). A division section 134 divides an output signal of the first subtraction section 133 by (ΔTob/ΔTval) and outputs a signal indicating the quotient as a black offset dark current component. A second subtraction section 135 subtracts the output signal of the division section 134 from the output signal Pn(x, n) of the aperture pixel output holding section 121. A third subtraction section 136 subtracts the output signal (circuit offset component) NULL(x) of the non-effective pixel output holding section 122 from an output signal of the second subtraction section 135 and outputs a signal indicative of the difference as an output signal of the correction calculation unit 12.

During the sixth period P6, the correction calculation unit 12 performs correction calculation with signals output from the pixels in the second row of the light-shielded pixel region 100 during this period.

According to the second embodiment, in the above-described correction calculation, correction values obtained from the pixels in the light-shielded pixel region 100 can be updated in real time during each period, as in the first embodiment. Since the charge accumulation period for the pixels in the light-shielded pixel region 100 is longer than that for the pixels in the aperture pixel region 101, a correction value for black offset caused by dark current can be obtained accurately. Furthermore, since the imaging device 14 includes the non-effective pixel region 601 in the second embodiment, a dark current component and a circuit offset component can be separated and correction calculation can then be performed.

Third Embodiment

The overall configuration of a solid-state imaging apparatus 1000 according to a third embodiment of the present invention is the same as that illustrated in FIG. 1 in the first embodiment. An imaging device 10 in the third embodiment has the same configuration as that illustrated in FIG. 2 in the first embodiment. The third embodiment differs from the first embodiment in the light-shielded pixel region 100. A light-shielded pixel region 100 in the third embodiment includes a long-second light-shielded pixel region (first light-shielded pixel region) and a short-second light-shielded pixel region (second light-shielded pixel region). The long-second light-shielded pixel region and the short-second light-shielded pixel region each include a plurality of pixels each including a light-shielded photoelectric converter 1001. A charge accumulation period for the pixels in the long-second light-shielded pixel region is longer than that for pixels in an aperture pixel region 101. A charge accumulation period for the pixels in the short-second light-shielded pixel region is shorter than that for the pixels in the aperture pixel region 101.

Figure 9:
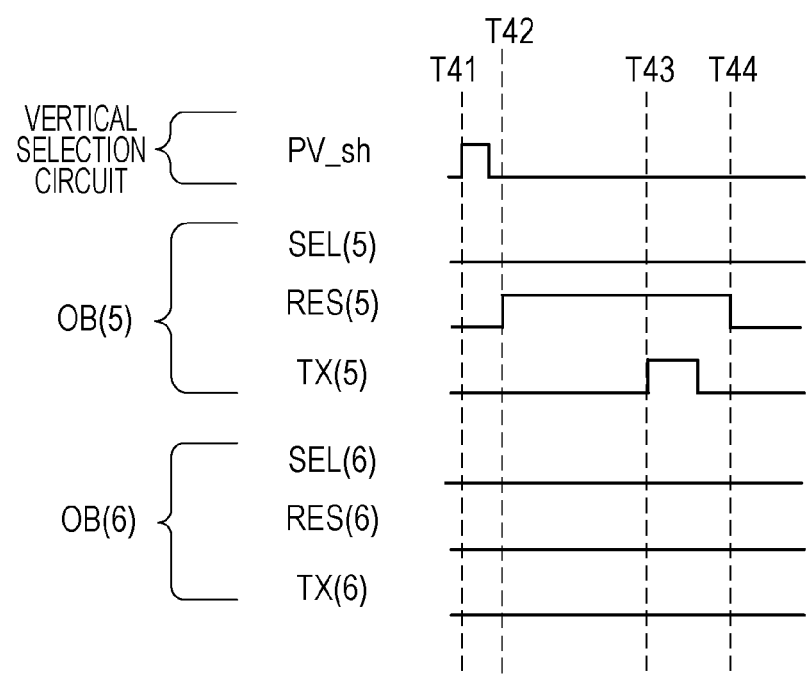
FIG. 9 is a diagram illustrating reset timing in a solid-state imaging apparatus according to a third embodiment.

FIG. 9 is a diagram illustrating reset timing (driving method) for the pixels in the light-shielded pixel region 100. At time T41, a timing generator 13 raises a shutter row selection pulse signal PV_sh for a vertical selection circuit 103 to HIGH, thus selecting a row in which the pixels are to be reset. In FIG. 9, the pixels in the fifth row, indicated at OB(5) in FIG. 9, of the light-shielded pixel region 100 are selected. At time T42, the vertical selection circuit 103 raises a signal RES(5) to HIGH, so that a reset transistor 1004 is turned on and the potential at an FD portion 1006 becomes a reset level in each of the pixels in the fifth row. At time T43, the vertical selection circuit 103 raises a signal TX(5) to HIGH, so that a transfer transistor 1002 is turned on and charge accumulated in the photoelectric converter 1001 is reset in each of the pixels in the fifth row. At this time, a signal SEL(5) remains a low level (LOW). Accordingly, a selection transistor 1005 in each of the pixels in the fifth row is in an OFF state, which does not affect a column signal line 102.

Figure 10:
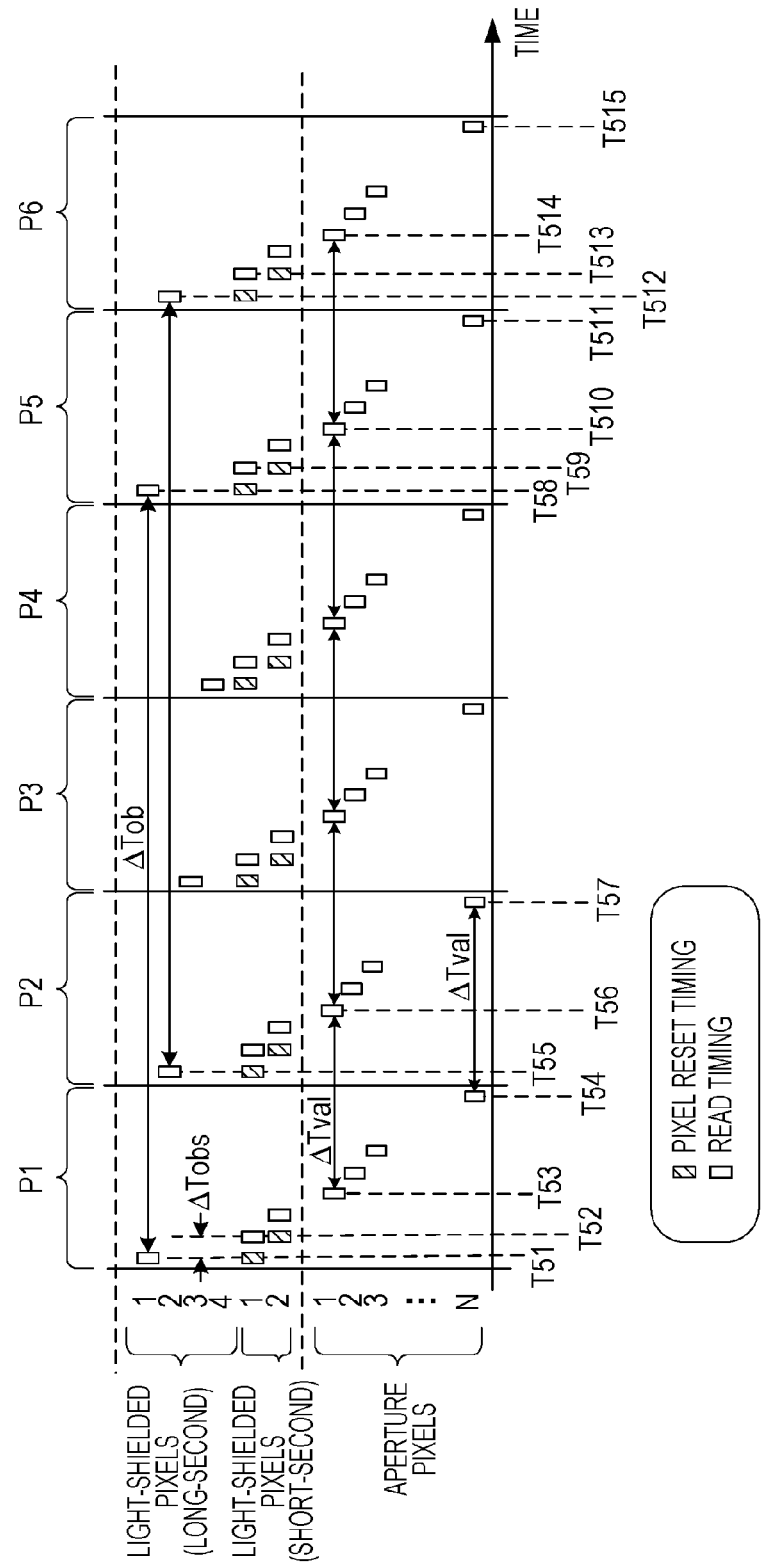
FIG. 10 is a diagram illustrating image frame timing in the solid-state imaging apparatus according to the third embodiment.

FIG. 10 is a diagram illustrating signal read timing (driving method) for the pixels in the long-second light-shielded pixel region, the short-second light-shielded pixel region, and the aperture pixel region 101 in first to sixth periods P1 to P6. FIG. 10 illustrates a case where the long-second light-shielded pixel region includes four rows of pixels, the short-second light-shielded pixel region includes two rows of pixels, and the aperture pixel region 101 includes N rows of pixels. Each period corresponds to a period from the start of signal reading of the pixels in the light-shielded pixel region 100 to the end of signal reading of the pixels in the Nth row of the aperture pixel region 101.

During the first period P1, at time T51, signals are read from the pixels in the first row of the long-second light-shielded pixel region. The second to fourth rows of the long-second light-shielded pixel region are not selected. In addition, the pixels in the first row of the short-second light-shielded pixel region are reset at time T51. In FIG. 10, pixel reset timing indicated by each hatched rectangle corresponds to a period from time T41 to time T44 in FIG. 9. At time T52, signals are read from the pixels in the first row of the short-second light-shielded pixel region and the pixels in the second row of the short-second light-shielded pixel region are reset. A charge accumulation period for the pixels in the first row of the short-second light-shielded pixel region is a period ($\Delta$Tobs) from time T51 to time T52. After that, signals are read from the pixels in the second row of the short-second light-shielded pixel region. During a period from time T53 to time T54, signals are sequentially read from the pixels in the first to Nth rows of the aperture pixel region 101 in ascending order from the first row.

During the second period P2, at time T55, signals are read from the pixels in the second row of the long-second light-shielded pixel region. The first, third, and fourth rows of the long-second light-shielded pixel region are not selected. In addition, the pixels in the first row of the short-second light-shielded pixel region are reset at time T55. Then, signals are read from the pixels in the first row of the short-second light-shielded pixel region and the pixels in the second row of the short-second light-shielded pixel region are reset. Then, signals are read from the pixels in the second row of the short-second light-shielded pixel region. After that, during a period from time T56 to time T57, signals are sequentially read from the pixels in the first to Nth rows of the aperture pixel region 101 in ascending order from the first row. A charge accumulation period for the pixels in the first row of the aperture pixel region 101 is a period ($\Delta$Tval in FIG. 10) from time T53 to time T56. Similarly, a charge accumulation period for the pixels in the Nth row of the aperture pixel region 101 is a period ($\Delta$Tval in FIG. 10) from time T54 to time T57, and equals the charge accumulation period for the pixels in the first row of the aperture pixel region 101.

During the third period P3, signals are not read from the pixels in the first, second, and fourth rows of the long-second light-shielded pixel region, signals are read from the pixels in only the third row of the long-second light-shielded pixel region, and the pixels in the first row of the short-second light-shielded pixel region are reset. Then, signals are read from the pixels in the first row of the short-second light-shielded pixel region and the pixels in the second row of the short-second light-shielded pixel region are reset. Then, signals are read from the pixels in the second row of the short-second light-shielded pixel region. After that, signals are sequentially read from the pixels in the first to Nth rows of the aperture pixel region 101 in ascending order from the first row.

During the fourth period P4, signals are not read from the pixels in the first to third rows of the long-second light-shielded pixel region, signals are read from the pixels in only the fourth row of the long-second light-shielded pixel region, and the pixels in the first row of the short-second light-shielded pixel region are reset. Then, signals are read from the pixels in the first row of the short-second light-shielded pixel region and the pixels in the second row of the short-second light-shielded pixel region are reset. Then, signals are read from the pixels in the second row of the short-second light-shielded pixel region. After that, signals are sequentially read from the pixels in the first to Nth rows of the aperture pixel region 101 in ascending order from the first row.

During the fifth period P5, at time T58, signals are read from the pixels in the first row of the long-second light-shielded pixel region and the pixels in the first row of the short-second light-shielded pixel region are reset. The second to fourth rows of the long-second light-shielded pixel region are not selected. A charge accumulation period for the pixels in the first row of the long-second light-shielded pixel region is a period ($\Delta$Tob in FIG. 10) from time T51 to time T58. The period $\Delta$Tob is four times the period $\Delta$Tval. At time T59, signals are read from the pixels in the first row of the short-second light-shielded pixel region and the pixels in the second row of the short-second light-shielded pixel region are reset. Then, signals are read from the pixels in the second row of the short-second light-shielded pixel region. After that, during a period from time T510 to time T511, signals are sequentially read from the pixels in the first to Nth rows of the aperture pixel region 101 in ascending order from the first row.

During the sixth period P6, the same operation as that in the second period P2 is performed. At time T512, signals are read from the pixels in the second row of the long-second light-shielded pixel region and the pixels in the first row of the short-second light-shielded pixel region are reset. At time T513, signals are read from the pixels in the first row of the short-second light-shielded pixel region and the pixels in the second row of the short-second light-shielded pixel region are reset. Then, signals are read from the pixels in the second row of the short-second light-shielded pixel region. After that, during a period from time T514 to time T515, signals are sequentially read from the pixels in the first to Nth rows of the aperture pixel region 101 in ascending order from the first row.

After that, the same operation as that in the third period P3 is performed and the same operation as that in the fourth period P4 is then performed. In other words, the operations in the first to fourth periods P1 to P4 are repeated. During each period, signals are read from the pixels of one row in the long-second light-shielded pixel region, signals are read from the pixels of the two rows in the short-second light-shielded pixel region, and signals are read from the pixels of the N rows in the aperture pixel region 101. The charge accumulation period for the pixels in the long-second light-shielded pixel region is four times that for the pixels in the aperture pixel region 101.

Although FIG. 10 illustrates the case where the long-second light-shielded pixel region includes four rows of pixels, the short-second light-shielded pixel region includes two rows of pixels, and the aperture pixel region 101 includes N rows of pixels, the present invention is not limited to the case where the long-second light-shielded pixel region includes four rows of pixels and the short-second light-shielded pixel region includes two rows of pixels. Furthermore, it is not always necessary to read signals from pixels in all rows of the aperture pixel region 101 included in the imaging device 10. Signals may be read from pixels in an intended portion of the aperture pixel region 101.

The vertical selection circuit 103 performs control such that the charge accumulation period $\Delta$Tob for the pixels in the long-second light-shielded pixel region is longer than the charge accumulation period $\Delta$Tval for the pixels in the aperture pixel region 101. In addition, the vertical selection circuit 103 performs control such that the charge accumulation period $\Delta$Tobs for the pixels in the short-second light-shielded pixel region is shorter than the charge accumulation period $\Delta$Tval for the pixels in the aperture pixel region 101.

Figure 11A:
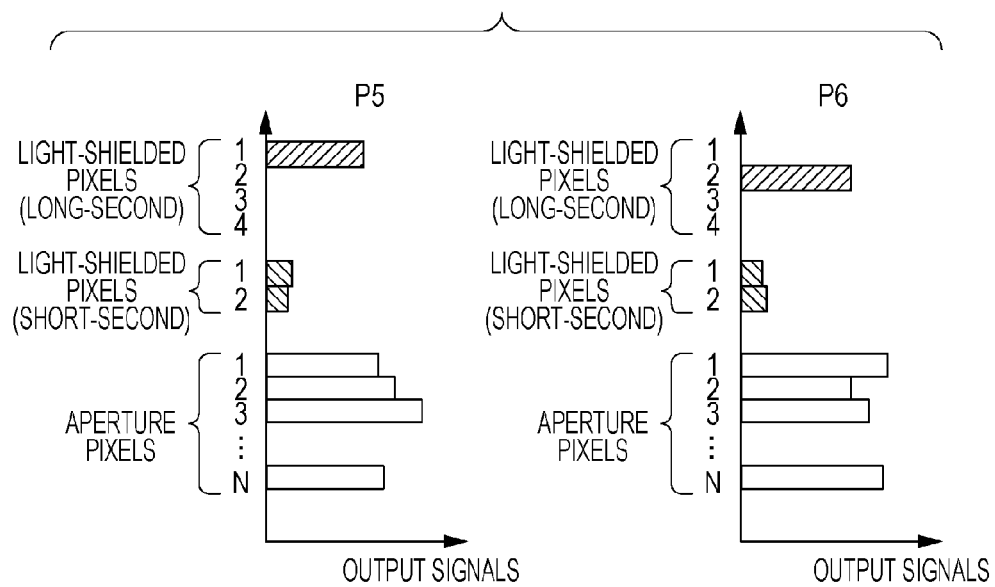
FIGS. 11A and 11B are diagrams illustrating a correction calculation unit of the solid-state imaging apparatus according to the third embodiment.

FIG. 11A is a schematic diagram illustrating output signals of pixels of a certain column in the long-second light-shielded pixel region, the short-second light-shielded pixel region, and the aperture pixel region 101 in the fifth and sixth periods P5 and P6. A correction calculation unit 12 corrects signals output from the pixels in the aperture pixel region 101 during each period with signals output from the pixels in the long-second light-shielded pixel region and signals output from the pixels in the short-second light-shielded pixel region during the period.

Figure 11B:
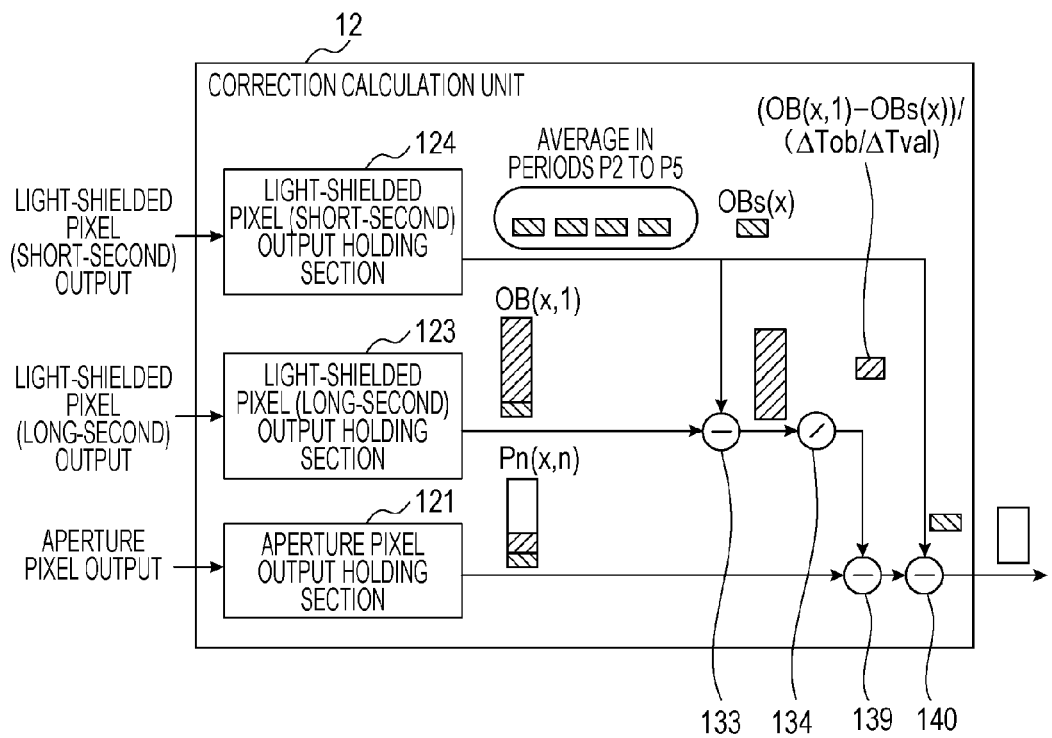

FIG. 11B is a diagram illustrating a method of correction by the correction calculation unit 12 in the third embodiment. During the fifth period P5, a light-shielded pixel (long-second) output holding section 123 holds signals output from the pixels in the first row of the long-second light-shielded pixel region. Let OB(x, 1) denote a value of an output signal, held by the light-shielded pixel (long-second) output holding section 123, of a pixel in the first row of the long-second light-shielded pixel region. If correction is performed for each column, the light-shielded pixel (long-second) output holding section 123 may include a line memory. If a column average value is used because of a small column-to-column variation, the light-shielded pixel (long-second) output holding section 123 may include a line averaging circuit and a memory for storing data of one pixel. The light-shielded pixel (long-second) output holding section 123 outputs a signal based on an output signal of a pixel in the long-second light-shielded pixel region.

An aperture pixel output holding section 121 holds output signals of the pixels in the aperture pixel region 101 and outputs a signal in synchronization with calculation timing. Let Pn(x, n) denote an output value of a pixel in the nth row of the aperture pixel region 101. If correction is performed for each column, the light-shielded pixel (long-second) output holding section 123 outputs an output value of a pixel of a column, specified by a column number of a pixel to be corrected in the aperture pixel region 101, in the long-second light-shielded pixel region. If a column average value is used, the same column average value is used during a single period.

A light-shielded pixel (short-second) output holding section 124 holds output signals of the pixels in the short-second light-shielded pixel region. Since the charge accumulation period $\Delta$Tobs for the pixels in the short-second light-shielded pixel region is short, an output signal is little affected by a dark current component proportional to the charge accumulation period and mainly includes an offset component of a circuit other than the photoelectric converter 1001. The circuit offset component includes a variation but has less dependence on temperature than the dark current component. Averaging output signals of pixels in the short-second light-shielded pixel region of frames can reduce the effect of variation. The light-shielded pixel (short-second) output holding section 124, therefore, holds an average value of output signals of pixels in the short-second light-shielded pixel region of several frames. Let OBs(x) denote a value of a signal held by the light-shielded pixel (short-second) output holding section 124. If correction is performed for each column, the light-shielded pixel (short-second) output holding section 124 may include a line memory. If a column average value is used because of a small column-to-column variation, the light-shielded pixel (short-second) output holding section 124 may include a line averaging circuit and a memory for storing data of one pixel in addition to a frame averaging circuit. The light-shielded pixel (short-second) output holding section 124 outputs a signal based on an output signal of a pixel in the short-second light-shielded pixel region.

The aperture pixel output holding section 121 holds output signals of the pixels in the aperture pixel region 101 and outputs a signal in synchronization with calculation timing. If correction is performed for each column, the light-shielded pixel (long-second) output holding section 123 and the light-shielded pixel (short-second) output holding section 124 each output a value of a pixel of a column specified by a column number of a pixel associated with a signal output by the aperture pixel output holding section 121. If a column average value is used, the same column average value is used during a single period.

Calculation of a black offset value will now be described. The output value OB(x, 1) of the light-shielded pixel (long-second) output holding section 123 includes a circuit offset component and a dark current component proportional to the charge accumulation period which is (ΔTob/ΔTval) times the charge accumulation period associated with the output value Pn(x, n) of the aperture pixel output holding section 121. A first subtraction section 137 subtracts the output signal OBs(x) of the light-shielded pixel (short-second) output holding section 124 from the output signal OB(x, 1) of the light-shielded pixel (long-second) output holding section 123. Then, a division section 138 divides an output signal of the first subtraction section 137 by (ΔTob/ΔTval) and outputs a signal indicating the quotient as a black offset dark current component. A second subtraction section 139 subtracts the output signal of the division section 138 from the output signal Pn(x, n) of the aperture pixel output holding section 121. A third subtraction section 140 subtracts the output signal (indicating the circuit offset component) OBs(x) of the light-shielded pixel (short-second) output holding section 124 from an output signal of the second subtraction section 139, and outputs a signal indicative of the difference as an output signal of the correction calculation unit 12.

During the sixth period P6, the correction calculation unit 12 performs correction calculation with signals output from the pixels in the second row of the long-second light-shielded pixel region during the sixth period P6 in a manner similar to that in the fifth period P5.

According to the third embodiment, in the above-described calculation, correction values obtained from the pixels in the long-second light-shielded pixel region can be updated in real time during each period, as in the first embodiment. Since the charge accumulation period ΔTob for the pixels in the long-second light-shielded pixel region is long, a correction value for black offset caused by dark current can be obtained accurately. In addition, an output signal based on charge accumulated in the short-second light-shielded pixel region for a short second period is used for correction, thus achieving separation between a dark current component and a circuit offset component and calculation without using any special pixel structure, e.g., the non-effective pixel region 601 in FIG. 6.

Fourth Embodiment

Figure 12:
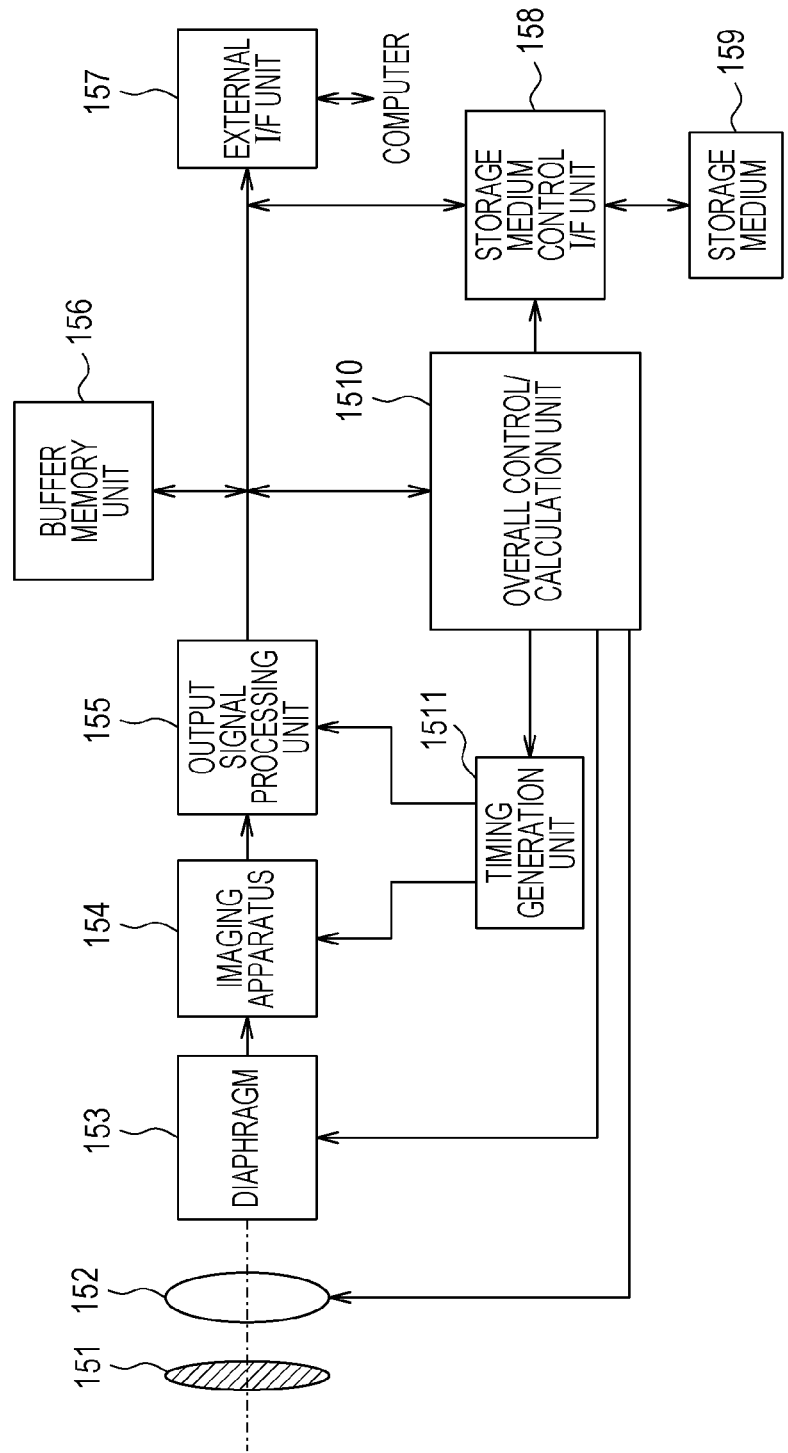
FIG. 12 is a diagram illustrating an exemplary configuration of an imaging system according to a fourth embodiment.

The above-described solid-state imaging apparatuses according to the first to third embodiments are applicable to various imaging systems. Examples of imaging systems include a digital still camera, a digital camcorder, and a surveillance camera. FIG. 12 is a schematic diagram illustrating a digital still camera, serving as an exemplary imaging system, including the solid-state imaging apparatus according to any of the above-described first to third embodiments. An imaging apparatus 154 corresponds to the solid-state imaging apparatus according to any of the first to third embodiments.

The imaging system illustrated in FIG. 12 includes the imaging apparatus 154, a barrier 151 for lens protection, a lens 152 for focusing an optical image of an object on the imaging apparatus 154, and a diaphragm 153 for changing the amount of light passing through the lens 152. The lens 152 and the diaphragm 153 are included in an optical system for converging light on the imaging apparatus 154. The imaging system of FIG. 12 further includes an output signal processing unit 155 that processes a signal output from the imaging apparatus 154 to generate an image.

The output signal processing unit 155 performs analog-to-digital (AD) conversion to convert an analog signal output from the imaging apparatus 154 into a digital signal. Additionally, the output signal processing unit 155 subjects image data to various correction processes as necessary, compresses the resultant data, and outputs the data. The imaging system of FIG. 12 further includes a buffer memory unit 156 for temporarily storing image data, an external interface (I/F) unit 157 for communication with, for example, an external computer, a storage medium 159, such as a semiconductor memory, which image data is stored to and read from, and a storage medium control I/F unit 158 for storing and reading data to/from the storage medium 159. The storage medium 159 may be included in or detachable from the imaging system.

The imaging system further includes an overall control/calculation unit 1510 and a timing generation unit 1511. The overall control/calculation unit 1510 controls various calculations and the entirety of the digital still camera. The timing generation unit 1511 outputs various timing signals to the imaging apparatus 154 and the output signal processing unit 155. The timing signals may be input to the system from an external device. The imaging system has only to include the imaging apparatus 154 and the output signal processing unit 155 that processes a signal output from the imaging apparatus 154. As described above, the imaging system according to the present embodiment including the imaging apparatus 154 is capable of performing an imaging operation.

Assuming that the imaging apparatus has an imaging plane phase difference autofocus (AF) function, the imaging apparatus 154 outputs a focus detection signal based on signals output from pixels for focus detection and an imaging signal to the output signal processing unit 155. The output signal processing unit 155 determines whether focusing has been achieved based on the focus detection signal. In addition, the output signal processing unit 155 generates an image based on the imaging signal. If the output signal processing unit 155 determines that focusing has not been achieved, the overall control/calculation unit 1510 drives the optical system in a direction in which focusing is to be achieved. The output signal processing unit 155 again determines whether focusing has been achieved based on a focus detection signal output from the imaging apparatus 154. The imaging apparatus 154, the output signal processing unit 155, and the overall control/calculation unit 1510 repeat the above-described operation until focusing is achieved.

It is to be understood that the above-described embodiments are intended to merely illustrate specific examples for implementing the present invention, and should not be construed as limiting the technical scope of the present invention in any way. In other words, the present invention can be implemented in various ways without departing from technical idea or main features of the present invention. Furthermore, the above-described embodiments can be implemented in various combinations.

According to the present invention, a change in black offset caused by dark current over time in movie shooting can also be accurately corrected in real time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-163733, filed Aug. 11, 2014, which is hereby incorporated by reference herein in its entirety.

What is claimed is:

1. A solid-state imaging apparatus comprising:
   a first light-shielded pixel region including two or more rows of pixels each including a photoelectric converter which is shielded from light;
   an aperture pixel region including pixels each including a photoelectric converter which is not shielded from light; and
   a control unit configured to perform control in such a manner that a charge accumulation period for the pixels in the first light-shielded pixel region is longer than a charge accumulation period for the pixels in the aperture pixel region and time to read signals from the pixels in a first row of the first light-shielded pixel region is different from time to read signals from the pixels in a second row of the first light-shielded pixel region,
   wherein a start time of the charge accumulation period for the pixels in the first row differs from a start time of the charge accumulation period for the pixels in the second row.

2. The apparatus according to claim 1, wherein the control unit performs control such that an interval between the time to read signals from the pixels in the first row of the first light-shielded pixel region and the time to read signals from the pixels in the second row of the first light-shielded pixel region is longer than or equal to the charge accumulation period for the pixels in the aperture pixel region.

3. The apparatus according to claim 1, further comprising:
   a correction calculation unit configured to correct an output signal of a pixel in the aperture pixel region with an output signal of a pixel in the first light-shielded pixel region.

4. The apparatus according to claim 3, wherein the correction calculation unit includes
   a division section configured to divide a signal based on an output signal of a pixel in the first light-shielded pixel region by a ratio of the charge accumulation period for the pixels in the first light-shielded pixel region to the charge accumulation period for the pixels in the aperture pixel region, and
   a subtraction section configured to subtract an output signal of the division section from a signal based on an output signal of a pixel in the aperture pixel region.

5. The apparatus according to claim 1, further comprising:
   a non-effective pixel region including pixels each including no photoelectric converter.

6. The apparatus according to claim 5, further comprising:
   a correction calculation unit configured to correct an output signal of a pixel in the aperture pixel region with an output signal of a pixel in the first light-shielded pixel region and an output signal of a pixel in the non-effective pixel region.

7. The apparatus according to claim 6, wherein the correction calculation unit includes
   a first subtraction section configured to subtract a signal based on an output signal of a pixel in the non-effective pixel region from a signal based on an output signal of a pixel in the first light-shielded pixel region,
   a division section configured to divide an output signal of the first subtraction section by a ratio of the charge accumulation period for the pixels in the first light-shielded pixel region to the charge accumulation period for the pixels in the aperture pixel region,
   a second subtraction section configured to subtract an output signal of the division section from a signal based on an output signal of a pixel in the aperture pixel region, and
   a third subtraction section configured to subtract the output signal based on the output signal of the pixel in the non-effective pixel region from an output signal of the second subtraction section.

8. The apparatus according to claim 1, further comprising:
   a second light-shielded pixel region including pixels each including a photoelectric converter which is shielded from light,
   wherein the control unit performs control such that a charge accumulation period for the pixels in the second light-shielded pixel region is shorter than the charge accumulation period for the pixels in the aperture pixel region.

9. The apparatus according to claim 8, further comprising:
   a correction calculation unit configured to correct an output signal of a pixel in the aperture pixel region with an output signal of a pixel in the first light-shielded pixel region and an output signal of a pixel in the second light-shielded pixel region.

10. The apparatus according to claim 9, wherein the correction calculation unit includes
    a first subtraction section configured to subtract a signal based on an output signal of a pixel in the second light-shielded pixel region from a signal based on an output signal of a pixel in the first light-shielded pixel region,
    a division section configured to divide an output signal of the first subtraction section by a ratio of the charge accumulation period for the pixels in the first light-shielded pixel region to the charge accumulation period for the pixels in the aperture pixel region,
    a second subtraction section configured to subtract an output signal of the division section from a signal based on an output signal of a pixel in the aperture pixel region, and
    a third subtraction section configured to subtract the signal based on the output signal of the pixel in the second light-shielded pixel region from an output signal of the second subtraction section.

11. An imaging system comprising:
    a solid-state imaging apparatus; and
    an output signal processing unit configured to process a signal output from the solid-state imaging apparatus to generate an image,
    the solid-state imaging apparatus comprising:
    a first light-shielded pixel region including two or more rows of pixels each including a photoelectric converter which is shielded from light;
    an aperture pixel region including pixels each including a photoelectric converter which is not shielded from light; and
    a control unit configured to perform control in such a manner that a charge accumulation period for the pixels in the first light-shielded pixel region is longer than a charge accumulation period for the pixels in the aperture pixel region and time to read signals from the pixels in a first row of the first light-shielded pixel region is different from time to read signals from the pixels in a second row of the first light-shielded pixel region, wherein a start time of the charge accumulation period for the pixels in the first row differs from a start time of the charge accumulation period for the pixels in the second row.

12. A method for driving a solid-state imaging apparatus that includes a first light-shielded pixel region including two or more rows of pixels each including a photoelectric converter which is shielded from light and an aperture pixel region including pixels each including a photoelectric converter which is not shielded from light, the method comprising:
   causing a charge accumulation period for the pixels in the first light-shielded pixel region to be longer than a charge accumulation period for the pixels in the aperture pixel region; and
   causing time to read signals from the pixels in a first row of the first light-shielded pixel region to be different from time to read signals from the pixels in a second row of the first light-shielded pixel region,
   wherein a start time of the charge accumulation period for the pixels in the first row differs from a start time of the charge accumulation period for the pixels in the second row.

13. The solid state imaging apparatus according to claim 1, wherein a period between the start time of the charge accumulation period for the pixels in the first row and the start time of the charge accumulation period for the pixels in the second row is greater than the charge accumulation period for the pixels in the aperture pixel region.

14. The solid state imaging apparatus according to claim 1, wherein a period between the start time of the charge accumulation period for the pixels in the first row and the start time of the charge accumulation period for the pixels in the second row is equal to the charge accumulation period for the pixels in the aperture pixel region.

15. The solid state imaging apparatus according to claim 1, wherein the charge accumulation period for the pixels in the first row is equal to the charge accumulation period for the pixels in the second row.

16. The solid state imaging apparatus according to claim 1, wherein a part of the charge accumulation period for the pixels in the first row overlaps a part of the charge accumulation period for the pixels in the second row.

17. The solid state imaging apparatus according to claim 1, wherein a part of the charge accumulation period for the pixels in the first light-shielded pixel region overlaps a part of the charge accumulation period for the pixels in the aperture pixel region.

* * * * *